United States Patent [19]

Loggers

[11] Patent Number: 4,738,436

[45] Date of Patent: Apr. 19, 1988

[54] SPRING SYSTEM

[75] Inventor: Jan N. H. Loggers, Papendrecht, Netherlands

[73] Assignee: Beleggingsmiv. Alex A. Loggers B.V., Netherlands

[21] Appl. No.: 85,223

[22] Filed: Aug. 13, 1987

Related U.S. Application Data

[63] Continuation of Ser. No. 894,399, Aug. 12, 1986, abandoned, which is a continuation of Ser. No. 599,071, Apr. 11, 1984, abandoned.

[51] Int. Cl.$^4$ .............................................. F16F 3/10
[52] U.S. Cl. ............................... 267/150; 188/321.11; 248/621; 267/33; 267/141.1; 267/152; 267/170; 267/293; 267/294; 384/202; 384/221; 403/132; 403/144
[58] Field of Search ................. 267/33, 292, 293, 294, 267/141.1, 150, 152, 153, 71, 170; 188/321.11, 379, 380; 248/621, 624, 605; 52/167; 403/76, 90, 122, 125, 132, 138, 14 L; 384/202, 203, 192, 193, 194, 206, 215, 222, 221

[56] References Cited

U.S. PATENT DOCUMENTS

| 214,670 | 4/1879 | Langen | 384/194 |
|---|---|---|---|
| 1,698,879 | 1/1929 | Curtis | 384/194 |
| 1,767,053 | 6/1930 | Curtis | 384/194 |
| 2,096,005 | 10/1937 | Piron | 267/33 X |
| 2,402,400 | 6/1946 | Hewitt et al. | 267/150 X |
| 2,468,939 | 5/1949 | Mercier | 188/321.11 |
| 2,892,482 | 6/1959 | Beoletto | 403/132 X |
| 3,037,787 | 6/1962 | Gottschald | 403/76 X |
| 3,120,382 | 2/1964 | Paulsen | 267/141.1 X |
| 3,348,796 | 10/1967 | Baratoff et al. | 248/624 X |
| 3,829,239 | 8/1974 | Rybicki et al. | 416/141 X |

FOREIGN PATENT DOCUMENTS

| 247124 | 1/1961 | Australia | 384/203 |
|---|---|---|---|
| 1120480 | 4/1956 | France | 267/33 |
| 2335747 | 7/1977 | France | 188/321.11 |
| 2352993 | 12/1977 | France . | |

Primary Examiner—George E. A. Halvosa

[57] ABSTRACT

A spring system for resiliently supporting a mass with respect to a base comprises a supporting member mounted for movement and which can be coupled to the mass and is bounded by a portion of a spherical surface which bears against a concentric complementary guiding spherical surface fixed with respect to the base to guide the supporting member to rotate in all directions around the center of the sphere. A circular resilient device is provided in engagement with the supporting member and is supported with respect to the base. The supporting member is coupled to the mass at a point inside the circular resilient device whereby the supporting member is tilted by radial shocks while its spherical surface is guided along the guiding spherical surface and by the deformations of the resilient device as a result thereof, a resilient couple and/or a radial resilient force is developed which tends to move the supporting member into its initial position.

12 Claims, 3 Drawing Sheets

SPRING SYSTEM

This application is a continuation of application Ser. No. 894,399, filed Aug. 12, 1986, which is a continuation of Ser. No. 599,071, filed Apr. 11, 1984, both now abandoned.

The invention relates to a spring system for resiliently supporting a mass with respect to a base which mass is subjected to loads in particular shock loads.

The object of the invention is to provide such spring system which is capable to take up relative large displacements in all radial directions with respect to a base which displacements are due to a shock, and to limit the acceleration forces acting on the resiliently supported mass to calculatable and acceptable values and to return to the initial position with a predetermined accuracy.

This object is achieved in that the spring system according to the invention comprises a supporting member mounted for a movement and adapted for being coupled to the mass, which supporting member is bounded by at least a portion of a spherical surface, which spherical surface substantially bears against a concentric complementary guiding spherical surface portion which is rigidly fixed with respect to the base for guiding said supporting member so that it is allowed to rotate in all directions around the center point of the sphere, means being provided for keeping the spherical surface portion of the supporting member always in engaging relationship with the guiding spherical surface portion, and circular resilient means are arranged which are in engagement with the supporting member and which on the other hand are supported with respect to the base, and means are provided for coupling the supporting member to the mass at a point inside the circular resilient means so that by the radial shock loads or by the radial component of shock loads acting on the mass, said supporting member is tilted while is spherical surface is guided along the guiding spherical surface and by the deformations of the resilient means as a result thereof, a resilient couple and/or a radial resilient force is developed which tends to move said supporting member into the initial position.

Preferably means for coupling said supporting member with the mass are formed by a spring member of which the axis coincides with a radius of the sphere and which is received between the two spaced apart supports arranged for a movement towards each other in compressing said spring member and which each are restrained from moving away from each other by means of an abutment member, which abutment members are in fixed connection with said supporting member whereas said supports are connected with the mass. In a spring system formed this way also axial shocks or shock-components in both directions can be absorbed by said spring member.

Advantageously the abutment members are formed on a sleeve-shaped housing which is fixed to said supporting member and the one support is formed by a disc-shaped member arranged for a sliding movement inside the housing and fixed to the one terminal end of a rod which extends through the sleeve-shaped housing, which rod is connected at its other end to the mass so that in a displacement of said mass with respect to the base in the one axial direction the mass engages the rod, whereas the other support is formed by a second disc-shaped member arranged for sliding movement with respect to the sleeve-shaped housing and through which the rod is slidably passed, said second disc-shaped member being in connection with the mass so that when said mass is displaced with respect to the base in the other axial direction, said mass engages said second disc-shaped member.

Preferably said means for keeping the spherical surface portion of the supporting member in engagement with the guiding spherical surface portion are formed by the circular resilient means which are prestressed. Said prestressing must be always at least equal to the maximum shock load in axial direction.

In an advantageous embodiment the supporting member has substantially the shape of a segment of a sphere whereas the guiding spherical surface portion is formed substantially at the inside of an annular member disposed around the supporting member, which annular member is securely fixed on a housing connected with the base.

Between the flat portion of the supporting member formed as a segment of a sphere and the resilient means a substantially disc-shaped member may be provided of which at least the outer circumference abuts against a head face of said annular member. Said disc-shaped member forms so to speak an intermediate construction which is also tilted when shock loads occur. However this tilting movement of the disc-shaped member occurs about a tilting point disposed on the head face of the annular member whereby, after a shock load, said disc-shaped member is returned with certainty to the initial position by a resilient moment acting on said member, so that also is assured that the supporting member returns accurately into its initial position.

Between the flat portion of the supporting member shaped as a segment of a sphere and the disc-shaped member a layer of an elastic material may be provided whereby any mechanical vibrations and contact sounds are damped.

In order to prevent the layer of elastic material from being deformed too much when the supporting member is tilted with respect to the disc-shaped member and/or when a too large axial force occurs, the outer circumference of the flat portion of the supporting member formed as a segment of a sphere projects beyond the outer circumference of the layer of elastic material and is provided with an abutment edge which is permitted to abut against the disc-shaped member.

Between the spherical surface of the supporting member and the guiding spherical surface, a layer of an elastic material may be provided which is secured to both said spherical surfaces. In this way tilting of the supporting member is attended with a shearing deformation of the layer of elastic material whereby any mechanical oscillations and contact sounds are damped and the spring system operates silently.

The resilient means may be formed by a tubular cylindrical body of a resilient material, said body preferably being formed by a plurality of superimposed annular bodies of a resilient material, rings of a rigid material being interposed between said bodies so that with each body such a ring of a rigid material is connected at both its head ends.

Preferably the sleeve-shaped housing extends through the supporting member to the inside of the circular resilient means, whereas the rod extending through said sleeve-shaped housing is preferably provided with a universal joint for coupling the mass.

The invention is described in more detail by referring to the drawing wherein.

Figure 1:
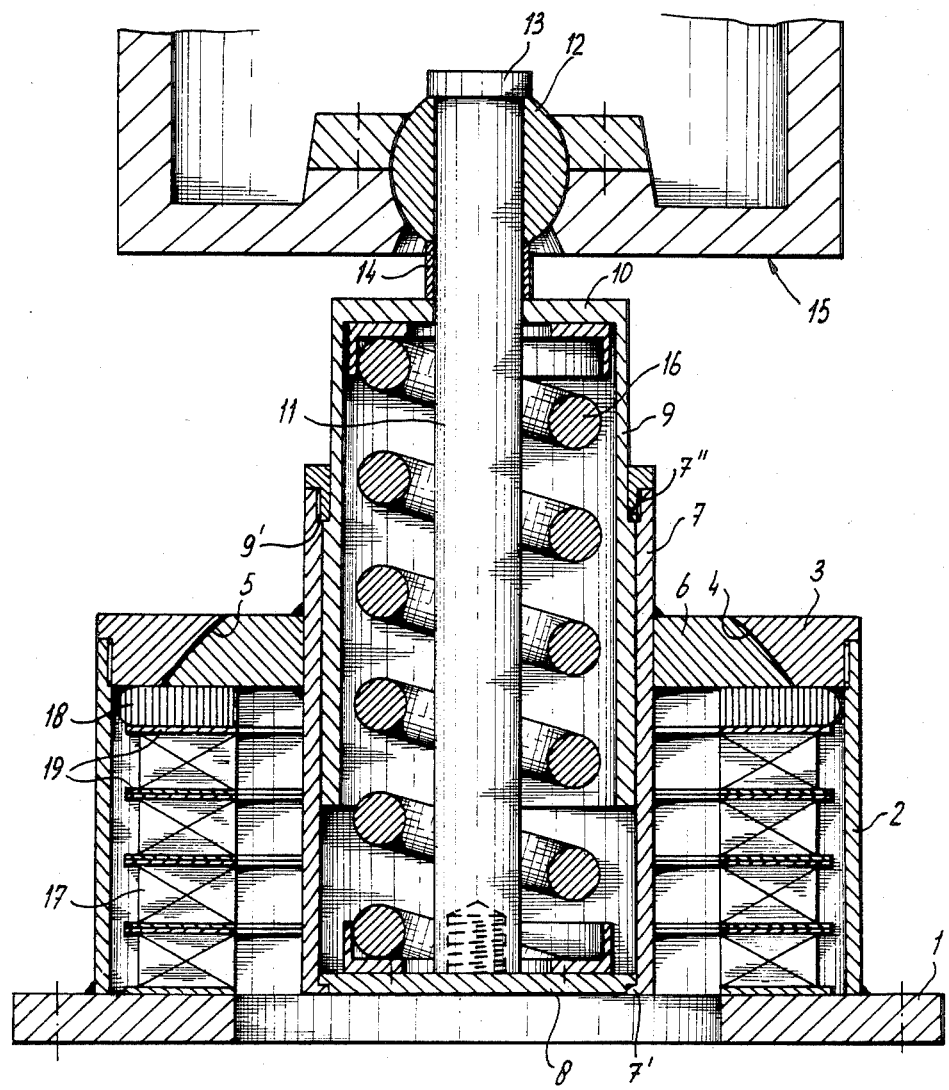
FIG. 1 shows in axial cross section a spring system according to the invention.

As shown in FIG. 1 the spring system comprises a cylindrical housing 2 mounted on a base 1. An annular member 3 is provided at the top side of said housing, which annular member 3 is bounded at its inner side by a portion of a spherical surface 4. Said portion of a spherical surface 4 serves as a guiding means for the complementary portion of a spherical surface 5 of a supporting member 6 shaped in the form of a truncated segment of a sphere. The supporting member 6 has a central orifice in which a sleeve-shaped housing 7 is securely fixed.

The housing 7 has a bottom 8 forming the support for a spring, which bottom is slidable up and down inside the housing 7 and abuts in its lower position against an abutment edge 7' formed to housing 7. The housing 7 has an open upper side in which a second sleeve-shaped housing 9 is received for an up and down sliding movement, the upward movement being limited by the inner abutment edge 7" formed to the housing 7 and a shoulder 9' formed on the housing 9 which cooperates with the abutment 7". The housing 9 is provided with a head wall 10 forming a second spring support and in which a central orifice is formed for passing the rod 11 which at its one end is fixed to the bottom 8 and at its other end carries a ball 12 arranged for a sliding movement along rod 11 and which is retained in its shown position by the collar 13 formed on the rod 11 and sleeve 14 supported by head wall 10 and arranged for a sliding movement along rod 11. The ball 12 forms a universal joint for the coupling with a resiliently supported mass 15 which is not shown in more detail.

Between the bottom 8 of housing 7 and head wall 10 of housing 9 a spring 16 is mouned which is capable to take up the axial shock load components in two directions.

For taking up the radial shock load components, a packet of one or more superimposed annular bodies 17 of a resilient material e.g. rubber or another elastomeric material which may be reinforced by fibers is provided, which body is clamped in prestressing it between the base 1 and a loose ring 18. The ring 18 bears at its other side against the lower head faces of the ring-shaped member 3 and the supporting member 6 which faces extend in one and the same plane. On both sides of each annular body 17 of a resilient material a ring 19 of a rigid material is attached for instance by vulcanisation, so that the bodies 17 abut against each other and against the base 1 and ring 18 respectively through said rings 19.

When, for instance as a result of a shock load, a force acts on mass 15, the axial component of said force will be taken up by spring 16, whereby in the one axial direction the sleeve-shaped housing 9 and in the other axial direction the bottom 8 will slide to the inside into the sleeve-shaped housing 7 in compressing spring 16. By the radial component of such force the entire assembly of housings 7, 9 and supporting member will swing about the center point of the concentric spheres of which the spherical surface portions 4 and 5 respectively forms a part, the spherical surface portion 5 of supporting member 6 sliding along the spherical surface portion 4 of the annular member 3. The ring 18 will then be tilted around a tilting point disposed on the lower head face of the annular member 3 so that the annular resilient bodies 17 are more compressed at the one side and are kept substantially in the same state at the other side so that a resilient couple is generated tending to return ring 18 and supporting member 6 into their initial positions. When the force has fallen off the spring 16 returns into its initial position whereas by said resilient couple, ring 18 is returned to its initial position until it abuts against the lower head face of annular member 3 whereby also the supporting member 6 is returned with certainty in its initial position and thereby the entire spring assembly.

It will be understood that the pre-stress in the resilient bodies 17 must be at least equal to the maximum axial component of the shock load since otherwise the spherical surface 5 will be permitted to get disengaged from the spherical surface 4.

Figure 2:
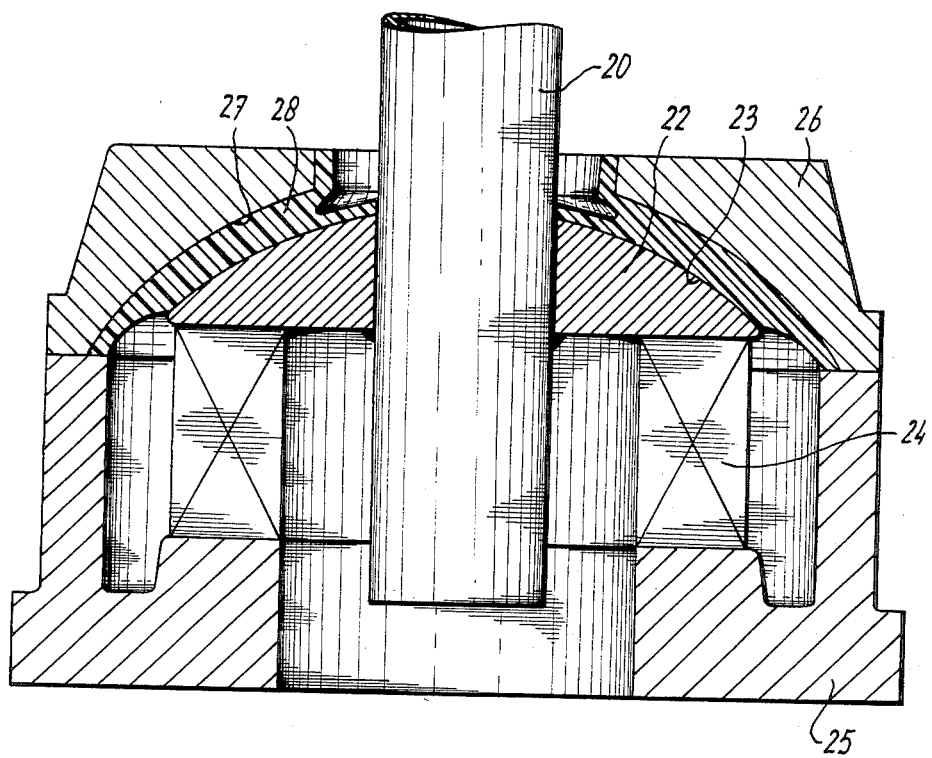
FIG. 2 shows in axial cross section another embodiment of the radial portion of a spring system according to the invention.

The ring 18 is not essential as shown in FIG. 2.

In FIG. 2 only the lower portion of the spring assembly is shown which serves for taking up radial force-components. For the sake of simplicity the assembly for taking up the axial force-components is only indicated by the sleeve-shaped housing 20 in FIG. 2 which housing corresponds to the sleeve-shaped housing 7 as shown in FIG. 1. Around said housing 20 a supporting member 22 is securely fixed which supporting member is shaped as a segment of a sphere which is bounded by the spherical surface portion 23. The annular spring means 24 which may be formed in the same way as shown in FIG. 1 by annular bodies 17 having rings of rigid material 19, are in direct engagement with the supporting member 22, said spring means 24 being also pre-stressed between the supporting member 22 and the housing 25.

On the housing 25 annular member 26 is mounted which is bounded at its inner side by a spherical surface portion 27 which is complementary with spherical surface 23.

As shown in FIG. 2 between the spherical surface portion 23 and 27 a layer 28 of an elastic material for instance rubber or another elastomeric material is provided, which layer is fixed by vulcanisation or in a different way to spherical surface portion 23 and 27 so that a tilting movement of supporting member 22 with respect to annular member 26, in taking the radial force components, is accompanied by a shearing deformation in layer 28 whereby mechanical oscillations and contact noise will be absorbed and the spring system operates more silently.

In this embodiment the spring means 24 are compressed at the one side and expanded at the other side in a tilting movement of the supporting member 22.

However it is not essential that the layer 28 is provided since it is also possible to make the supporting member 22 and annular member 26 self-lubricating or to provide a lubricating film for instance of polytetrafluorethylene between the spherical surfaces 23 and 27.

Figure 3:
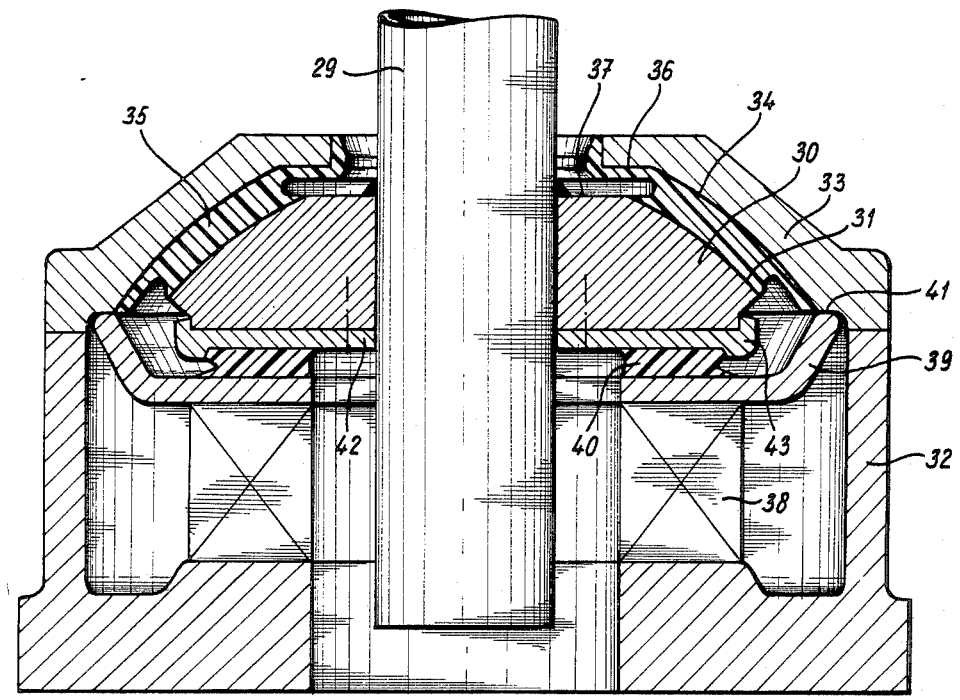
FIG. 3 shows in axial cross section a third embodiment of the radial portion of a spring system according to the invention.

Also in the embodiment shown in FIG. 3 only the lower portion of the spring assembly is shown which portions serve for taking up radial force components whereas the assembly for taking up the axial force components is also only shown by sleeve-like housing 29. Around said housing 29 a supporting member 30 is fixed which is bounded by the spherical surface 31. In the same way as shown in FIG. 2 a housing 32 is provided on which the annular member 33 is mounted which is bounded at its inner side by a spherical surface portion 34 which is complementary with the spherical surface portion 31, between said spherical surface portions 31 and 34 a layer 35 of an elastic material for instance rubber or another elastomeric material being provided, which layer is fixed by vulcanisation or in a different way to spherical surface portions 31 and 34 in the same way as shown in FIG. 2. However in this case a flat portion 36 is formed on the inner side of annular member 33, which portion is formed for cooperation with the flattened top side 37 of supporting member 30 through a portion of layer 35 of elastic material to prevent the layer 35 from being deformed too much as a result of the tilting movement of supporting member 30 and/or of a too large axial force.

The annular spring means 38 which may be formed in the same way as shown in FIG. 1, are pre-stressed between the housing 32 and annular member 39 which annular member corresponds substantially to the annular member 18 in FIG. 1. However in this case the annular member 39 does not abut directly against supporting member 30 but through a ring 40 of a resilient material. The outer circumferential portion of ring 39 is bent upwardly so that the outer edge of said ring abuts against an abutment face 41 of annular member 33. An auxiliary ring 42 is fixed to the bottom side of supporting member 30, which auxiliary ring is provided at its outer circumference with an enlarged edge 43 which forms an abutment for supporting member 30, which abutment is permitted to abut against the ring 39 so that the spring 40 of a resilient material is prevented from being overloaded in a tilting and/or axial movement of the supporting member 30 with respect to ring 10.

I claim:

1. A spring system for resiliently supporting a mass with respect to a base, which mass is subjected to loads, in particular shock loads which may include a component directed radially with respect to the mass, characterized in that the spring system comprises a housing, a supporting member mounted on said housing for a movement with respect to said housing and adapted for being coupled to the mass, coupling means for coupling said supporting member to the mass, said supporting member being bounded by an arcuate surface that is a portion of a spherical surface and which substantially bears against a concentric complementary guiding surface portion which is also arcuate and a portion of another spherical surface and which is rigidly fixed with respect to the base for guiding said supporting member so that it is allowed to rotate in all directions around the center point of the concentric spherical surfaces, said supporting member being adapted to assume an initial position with respect to said housing when no force is applied to the mass, circular resilient means for biasing the spherical surface portion of the supporting member toward engaging relationship with the guiding spherical surface portion and for accommodating any radially directed forces to which the mass may be subjected, said circular resilient means being prestressed and bearing against the supporting member and also against a portion of said housing which is located adjacent to said supporting member and being supported on the base, said coupling means being arranged for coupling the supporting member to the mass at a point inside the circular resilient means so that loading applied to said resilient means by the radial shock loads or by the radial component of shock loads acting on the mass causes said supporting member to be tilted from the initial position while its spherical surface moves with respect to the guiding surface and is guided along the guiding spherical surface with said resilient means having one portion thereof remaining in contact with said housing adjacent to said supporting member while said supporting member biases another portion of said resilient means in a direction away from contact with said housing adjacent to said supporting member so that said housing controls deformation of said resilient means and a controlled resilient force is developed which tends to move said supporting member into the initial position when the loading applied to said resilient means has disappeared and the control exerted on said resilient means by said housing tends to prevent said resilient means from moving said supporting member beyond the initial position when the loading applied to said resilient means has disappeared, said coupling means for coupling said supporting member to the mass including a tubular housing element fixedly connected to said supporting member, a spring member positioned within said tubular housing element and which has a longitudinal axis which coincides with a radius of the concentric spherical surfaces and which is received between two spaced apart spring retainer members arranged for movement towards each other to compress said spring member, one of said spring retainer members including a tubular spring retainer element which is telescopingly received in said tubular housing element, said spring retainer members having abutment means for preventing separation of said telescopingly connected tubular elements, said abutment means being fixed with respect to said supporting member via the fixed connection between said tubular housing element and said supporting member.

2. Spring system according to claim 1 characterized in that the supporting member has substantially a shape of a segment of a sphere whereas the guiding spherical surface portion is formed substantially at the inside of an annular member disposed around the supporting member, which annular member is securely fixed on a housing connected with the base.

3. Spring system according to claim 1, characterized in that said resilient means is formed by a tubular cylindrical body of a resilient material.

4. Spring system according to claim 3, characterized in that said tubular cylindrical body is formed by a plurality of superimposed annular bodies of a resilient material, rings of a rigid material being interposed between said superimposed annular bodies so that with each annular body such a ring of a rigid material is connected at both its head ends.

5. Ring system according to claim 1, characterized in that said tubular housing element extends through the supporting member to the inside of the circular resilient means.

6. Spring system according to claim 1, characterized in that a rod extends through said tubular housing element and is provided with a universal joint for coupling the mass.

7. A spring system for resiliently supporting a mass with respect to a base, which mass is subjected to loads, in particular shock loads which may include a component directed radially with respect to the mass, characterized in that the spring system comprises a housing, a supporting member mounted on said housing for a movement with respect to said housing and adapted for being coupled to the mass, coupling means for coupling said supporting member to the mass, said supporting member being bounded by an arcuate surface that is a portion of a spherical surface and which substantially bears against a concentric complementary guiding surface portion which is also arcuate and a portion of another spherical surface and which is rigidly fixed with respect to the base for guiding said supporting member so that it is allowed to rotate in all directions around the center point of the concentric spherical surfaces, said supporting member being adapted to assume an initial position with respect to said housing when no force is applied to the mass, circular resilient means for biasing the spherical surface portion of the supporting member toward engaging relationship with the guiding spherical surface portion and for accommodating any radially directed forces to which the mass may be subjected, said circular resilient means being prestressed and bearing against the supporting member and also against a portion of said housing which is located adjacent to said supporting member and being supported on the base, said coupling means being arranged for coupling the supporting member to the mass at a point inside the circular resilient means so that loading applied to said resilient means by the radial shock loads or by the radial component of a shock loads acting on the mass causes said supporting member to be tilted from the initial position while its spherical surface moves with respect to the guiding surface and is guided along the guiding spherical surface with said resilient means having one portion thereof remaining in contact with said housing adjacent to said supporting member while said supporting member biases another portion of said resilient means in a direction away from contact with said housing adjacent to said supporting member so that said housing controls deformation of said resilient means and a controlled resilient force is developed which tends to move said supporting member into the initial position when the loading applied to said resilient means has disappeared and the control exerted on said resilient means by said housing tends to prevent said resilient means from moving said supporting member beyond the initial position when the loading applied to said resilient means has disappeared, said coupling means for coupling said supporting member to the mass including a tubular housing element fixedly connected to said supporting member, a spring member positioned within said tubular housing element and which has a longitudinal axis which coincides with a radius of the concentric spherical surfaces and which is received between two spaced apart spring retainer members arranged for movement towards each other to compress said spring member, one of said spring retainer members including a tubular spring retainer element which is telescopingly received in said tubular housing element, said spring retainer members having abutment means for preventing separation of said telescopingly connected tubular elements, said abutment means being fixed with respect to said supporting member via the fixed connection between said tubular housing element and said supporting member, the other of said spring retainer members being formed by a disc-shaped member arranged for a sliding movement inside the tubular housing element and being fixed to one terminal end of a rod which extends through the tubular housing element, said rod being connected at its other end to the mass so that in a displacement of said mass with respect to the base in one axial direction the mass engages the rod, the tubular spring retainer element including a second disc-shaped member arranged for sliding movement with respect to the tubular housing element and through which the rod is slidably passed, and said second disc-shaped member being in connection with the mass so that when said mass is displaced with respect to the base in the other axial direction, said mass engages with said disc-shaped member.

8. Spring system according to claim 7, characterized in that the supporting member has substantially the shape of a segment of a sphere whereas the guiding spherical portion is formed substantially at the inside of an annular member disposed around the supporting member which annular member is securely fixed on a housing connected with the base.

9. A spring system for resiliently supporting a mass with respect to a base, which mass is subjected to loads, in particular shock loads which may include a component directed radially with respect to the mass, characterized in that the spring system comprises a housing, a supporting member mounted on said housing for a movement with respect to said housing and adapted for being coupled to the mass, coupling means for coupling said supporting member to the mass, said supporting member being bounded by an arcuate surface that is a portion of a spherical surface and which substantially bears against a concentric complementary guiding surface portion which is also arcuate and a portion of another spherical surface and which is rigidly fixed with respect to the base for guiding said supporting member so that it is allowed to rotate in all directions around the center point of the concentric spherical surfaces, said supporting member being adapted to assume an initial position with respect to said housing when no force is applied to the mass, said guiding spherical surface-portion being formed substantially at the inside of an annular member disposed around the supporting member and securely fixed on said housing, circular resilient means for biasing the spherical surface portion of the supporting member toward engaging relationship with the guiding spherical surface portion and for accommodating any radially directed forces to which the mass may be subjected, a substantially disc-shaped member being provided between a flat portion of the supporting member and the resilient means, at least the outer circumference of said disc-shaped member abutting against a head face of said annular member, said circular resilient means being prestressed and bearing against the supporting member and also being supported on the base, said coupling means being arranged for coupling the supporting member to the mass at a point inside the circular resilient means so that loading applied to said resilient means by the radial shock loads or by the radial component of shock loads acting on the mass causes said supporting member to be tilted from the initial position while its spherical surface moves with respect to the guiding surface and is guided along the guiding spherical surface with said resilient means having one portion thereof remaining in contact with said annular member adjacent to said supporting member while said supporting member biases another portion of said resilient means in a direction away from contact with said housing adjacent to said supporting member so that said housing controls deformation of said resilient means and a controlled resilient force is developed which tends to move said supporting member into the initial position when the loading applied to said resilient means has disappeared and the control exerted on said resilient means by said housing tends to prevent said resilient means from moving said supporting member beyond the initial position when the loading applied to said resilient means has disappeared, said coupling means for coupling said supporting member to the mass including a tubular housing element fixedly connected to said supporting member, a spring member positioned within said tubular housing element and which has a longitudinal axis which coincides with a radius of the concentric spherical surfaces and which is received between two spaced apart spring retainer members arranged for movement towards each other to compress said spring member, one of said spring retainer members including a tubular spring retainer element which is telescopingly received in said tubular housing element, said spring retainer members having abutment means for preventing separation of said telescopingly connected tubular elements, said abutment means being fixed with respect to said supporting member via the fixed connection between said tubular housing element.

10. Spring system according to claim 9, characterized in that between the flat portion of the supporting member shaped as a segment of a sphere and the disc-shaped member a layer of an elastic material is provided.

11. Spring system according to claim 10, characterized in that the outer circumference of the flat portion of the supporting member formed as a segment of a sphere projects beyond the outer circumference of the layer of elastic material and is provided with an abutment edge which is permitted to abut against the disc-shaped member.

12. A spring system according to claim 9, characterized in that there is provided a layer of elastic material between said portions of spherical surfaces.

* * * * *